US012670282B2

(12) United States Patent
Macksood et al.

(10) Patent No.: US 12,670,282 B2
(45) Date of Patent: Jun. 30, 2026

(54) METHOD AND SYSTEM OF STORING ACLS IN A FILE STORAGE SYSTEM USING A REFERENCE

(71) Applicant: Microsoft Technology Licensing, LLC, Redmond, WA (US)

(72) Inventors: Mohamed Azmil Macksood, Oslo (NO); Pedro Miguel Lima De Jesus Vieira, Amora (PT); Gjorgji Rankovski, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 75 days.

(21) Appl. No.: 18/649,050

(22) Filed: Apr. 29, 2024

(65) Prior Publication Data

US 2025/0335617 A1 Oct. 30, 2025

(51) Int. Cl.
*G06F 21/62* (2013.01)
(52) U.S. Cl.
CPC ................................ *G06F 21/6218* (2013.01)
(58) Field of Classification Search
None
See application file for complete search history.

(56) References Cited

U.S. PATENT DOCUMENTS 8,352,497 B1 1/2013 Chatterjee
11,443,054 B2 9/2022 Mehta

2006/0123005 A1 6/2006 Burnett
2015/0278543 A1* 10/2015 Zhang ................. G06F 21/6218
707/784
2018/0307853 A1 10/2018 Mehta et al.
2018/0330106 A1 11/2018 Douceur

OTHER PUBLICATIONS

Thelis R. S., et al., "Access Agent: Improving The Performance Of Access Control Lists", International Journal of Scientific & Technology Research, vol. 5, Apr. 4, 2016, 8 pages.
Extended European Search Report Received in European Application No. 25171075.2, mailed on Aug. 28, 2025, 13 Pages.

* cited by examiner

*Primary Examiner* — Brandon Hoffman
(74) *Attorney, Agent, or Firm* — Novo TechIP International PLLC

(57) ABSTRACT

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

18 Claims, 9 Drawing Sheets

500

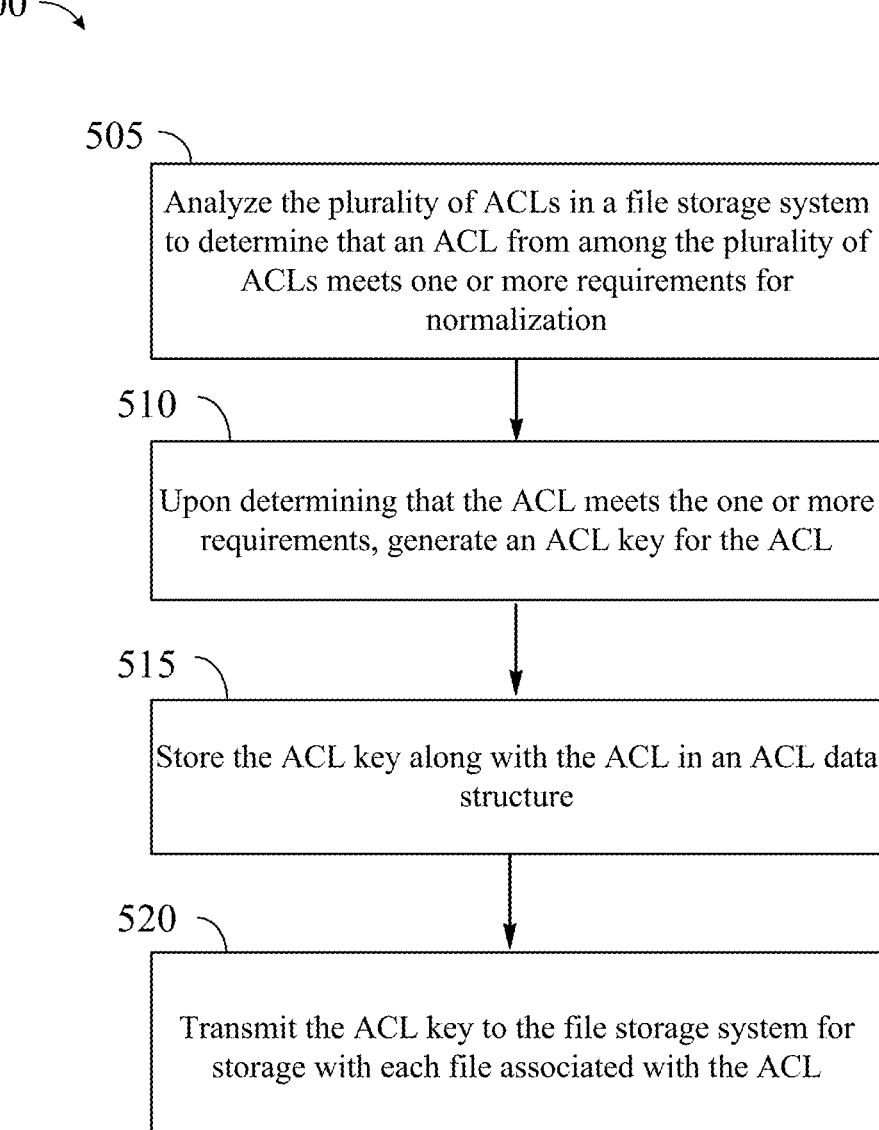

505

Analyze the plurality of ACLs in a file storage system to determine that an ACL from among the plurality of ACLs meets one or more requirements for normalization

510

Upon determining that the ACL meets the one or more requirements, generate an ACL key for the ACL

515

Store the ACL key along with the ACL in an ACL data structure

520

Transmit the ACL key to the file storage system for storage with each file associated with the ACL

FIG. 5

METHOD AND SYSTEM OF STORING ACLS IN A FILE STORAGE SYSTEM USING A REFERENCE

BACKGROUND

Most digital files have properties that indicate which users are allowed to access the file and/or the type of access allowed. This is particularly true for enterprise storage systems where different users have different authorities with respect to different documents. One of the ways in which access to digital file is managed is by using an access control list (ACL). An ACL is often a set of permissions that specifies which users or systems are granted or denied access to a particular resource (e.g., a file or system), and what types of operations are allowed on the given resources. Each entry in a typical ACL specifies a subject and an operation.

One of the ways in which ACLs are utilized to manage access control is to generate and store a separate ACL for each file. Existing solutions often store ACLs together with the file associated with the ACL. ACLs can range in size from 100 bytes to multiple megabytes. In large storage systems, having thousands or millions of files, storing an ACL for each individual file results in a significant use of memory space. As a result, for many computer systems, ACLs contribute to a large portion of the total size of the file storage system.

Hence, there is a need for improved systems and methods of storing and using ACLs for digital files.

SUMMARY

In one general aspect, the instant disclosure presents an ACL management system for reducing an amount of memory space required to store a plurality of files, the ACL management system having a processor and a memory in communication with the processor wherein the memory stores executable instructions that, when executed by the processor alone or in combination with other elements, cause the ACL management system to perform multiple functions. The function may include analyzing a plurality of ACLs in a file storage system to determine that an ACL from among the plurality of ACLs meets one or more requirements, the file storage system storing the plurality of files, wherein each file of the plurality of files is associated with an ACL. Upon determining that the ACL from among the plurality of ACLs meets the one or more requirements, generating an ACL key for the ACL, the ACL key being an identifiable integer reference to the ACL. The functions also include storing the ACL key and the ACL in an ACL data structure and transmitting the ACL key to the file storage system for storage in an ACL hint file, the ACL hint file storing the ACL key for any file associated with the ACL.

In yet another general aspect, the instant disclosure presents a method for reducing an amount of memory space required for storing a plurality of ACLs associated with resources in a file storage system. In some implementations, the method includes analyzing the plurality of ACLs in the file storage system, via an ACL management system, to determine that an ACL from among the plurality of ACLs meets one or more requirements for normalization, the ACL management system being external to the file storage system and the file storage system storing a plurality of resource, where each resource of the plurality of resource in the file storage system is stored with an associated ACL. Upon determining that the ACL from the among the plurality of ACLs meets the one or more requirements, generating an ACL key for the ACL, the ACL key referencing the ACL. The method also includes storing the ACL key and the ACL in an ACL data structure that is external to the file storage system and transmitting the ACL key to the file storage system for storage with each file associated with the ACL, instead of storing the ACL.

In a further general aspect, the instant application describes A file storage system for reducing an amount of memory space required to store a plurality of files, the file storage system having a processor and a memory in communication with the processor wherein the memory stores executable instructions that, when executed by the processor alone or in combination with other elements, cause the ACL management system to perform multiple functions. The function may include receiving a request to store a file in the files storage system, generating an Access Control List (ACL) for the file based on the request, transmitting the ACL to an ACL management system for analysis to determine if the ACL meets one of more requirements, receiving an ACL key for the ACL from the ACL management system, the ACL key referencing the ACL, and storing the ACL key for the file instead of the generated ACL.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 5 is a flow diagram depicting an exemplary method for utilizing a separate ACL data structure in a file storage system to determine access rights to files.

DETAILED DESCRIPTION

Figure 1:
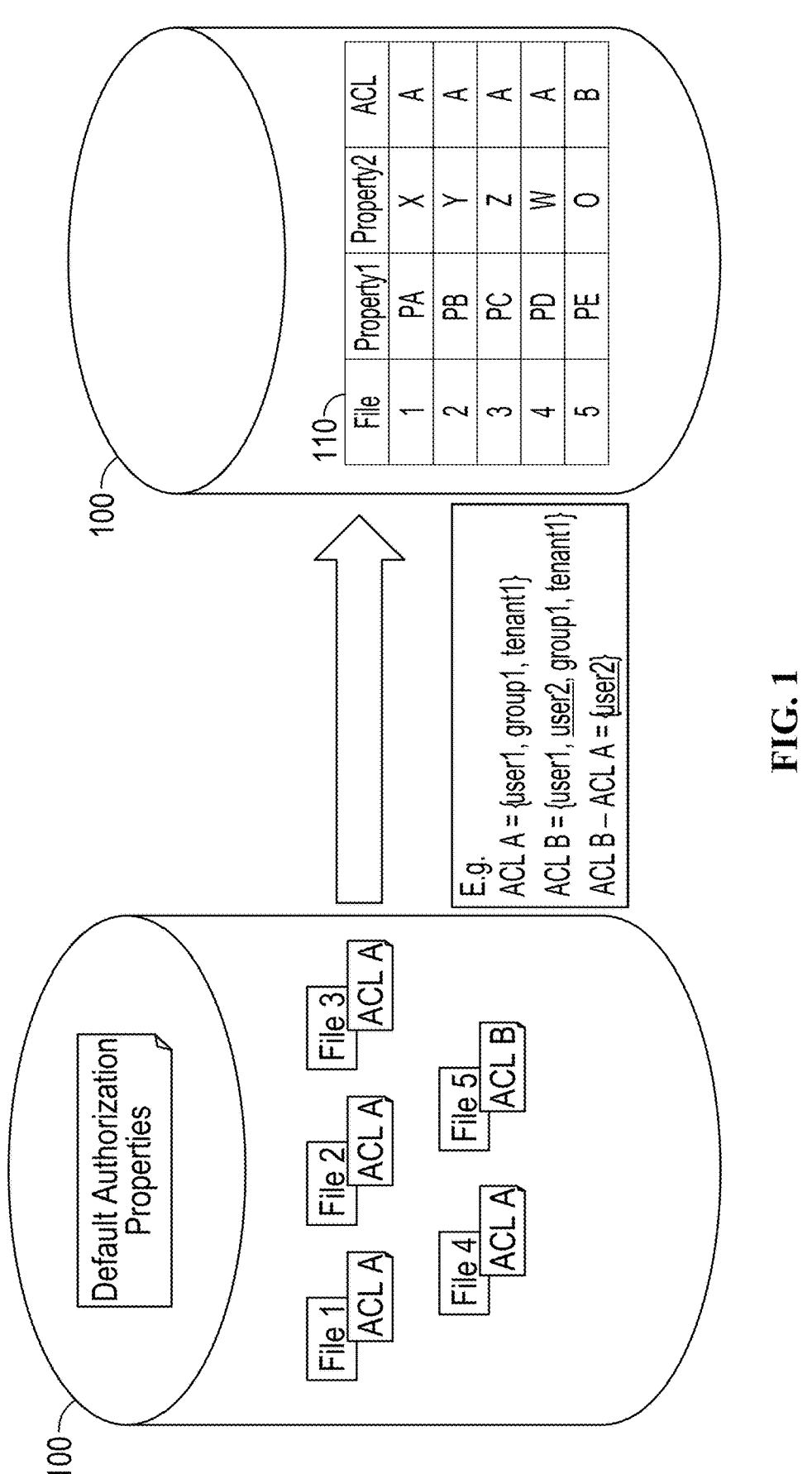
FIG. 1 depicts an example manner in which ACLs are stored in prior art systems.

It is common in today's storage systems to utilize and store an ACL for each file in the system. ACLs often store information about who can access a resource (e.g., a user, set of users, groups, tenants, etc.) and may include information about the type of access permitted. When a user requests access to a resource, an authorization check is executed against that resource's ACL to determine if the user is allowed access or if the type of access requested by the user is permitted. To ensure that each resource (e.g., file) has an ACL, an ACL is often generated during the resource creation process. While an ACL is often generated and stored for each file when the file is created, the generated ACL often contains default parameters. This is because, while it is customary to use an ACL to determine access permissions, not all users/file creators utilize the ACL to create customized permissions. As a result, most ACLs include default permission parameters. Furthermore, when an item (e.g., a file) is created from another file (e.g., via a save as operation), the item generally inherits the parent's hierarchical ACL. After the item is created, however, there is no longer a direct connection between the item's ACL and the parent's ACL, as updates are independent. Very often the parent's ACLs does not change, meaning that there is a high probability that most parent and new items have the same ACL throughout their lifecycle. While many ACLs are likely to contain the same data, they are still stored as separate entities for each resource. ACLs can range in size from small (e.g., 100 bytes) to significantly large (e.g., multiple MBs). With the number of files in a given file storage system, the number of ACLs in the system take a significantly large amount of memory space to store. Thus, there exists a technical problem in the current file storage system of storing and utilizing ACLs in an inefficient manner that results in unnecessary use of memory resources.

To address these technical problems and more, in an example, this description provides technical solutions for analyzing and normalizing ACLs in a file storage system based on a set of parameters and creating a reference data structure for storing unique ACLs. A unique identifiable reference to the ACL is stored with the file and is used to refer to the reference data structure when a request for access to the file is received. In some implementations, this involves the use of an inventory of hashes of ACLs, where the largest in size ACLs and/or ACLs that are most frequently used are added to a hint file. Then, at the time of a new ingestion (e.g., when a new file is saved), based on a predetermined schedule or based on a request to analyze the files in a file storage system, the ACL for the new file, or some or all the files in the system are analyzed and if the ACL for a file is one in the hint file, a uniquely identifiable integer reference to the ACL is stored. This reference is used to retrieve the ACL when a request to access the file is received. Thus, instead of storing a separate ACL for each file in the system, a hint file which only includes a reference to many of the ACLs is stored in the storage system. The hint file requires a lot less space than the numerous ACLs in the file storage system as the hint file merely includes an identifiable reference to ACLs that are normalized, and not the entire content of the ACLs. The ACLs themselves are stored in a separate data structure/data store which stores each unique ACL once. As many of the ACLs in the file storage system are exact copies of each other, storing each unique ACL once significantly reduces the amount of memory resources required to store ACLs. Accordingly, instead of storing an ACL tens, hundreds or thousands of times, the ACL is stored only once. This results in significant memory optimization of the file storage system, which in turn leads to access performance increase, thus improving the performance of the computing systems used for storage and retrieval of resources.

As will be understood by persons of skill in the art upon reading this disclosure, benefits and advantages provided by such implementations can include, but are not limited to, a technical solution to the technical problems of lack of mechanisms for efficient storage and utilization of ACLs in file storage systems. The technical solutions enable significant reduction in the storage space required to store ACLs in a file storage system. Current file storage systems store an ACL for each resource (e.g., each file) stored in the system. Many of the stored ACLs are copies of a default ACL, thus the same ACL is stored multiple times in the system. By storing each default ACL once instead of many times, significant memory space is saved. This not only reduces the amount of memory resources required to store and manage ACLs but also optimizes access performance. As a result, access to files stored in the file storage system can be provided more quickly and more efficiently. In this manner, the technical solution improves the operation and efficiency of computer systems that store files. The technical effects at least include improving the functionality of computing environments by reducing the amount of memory resources required to store a large number of files.

The term "resource" as used herein refers to any digital item for which an ACL may be used to manage access. A resource may include digital files, software programs, and other digital item to which an ACL may be connected to control its use. While the term "file" is used primarily in this disclosure, any reference to file can include other types of resources for which an ACL may be used.

FIG. 1 depicts an example manner in which ACLs were stored in prior art systems. In a system having a data storage medium such as the data store 100, a number of file such as File, 1, File 2, File 3, File 4 and File 5 are stored. Each of these files is associated with an individual ACL. In the example data store 100, Files 1, 2, 3, and 4 have the same ACL, referred to herein as ACL A, while file 5 has a different ACL, referred to herein as ACL B. That is because, in most systems, such as the data store 100, a given tenant has defined a set of default authorization properties that all new content inherit. The default authorization properties are contained in the ACL A. As a result, as new files are created, most of these files will use the default ACL (e.g., ACL A) and a smaller set of files will have a different ACL (e.g., ACL B). Thus, a large number of files in the data store have the default ACL. This is further illustrated in table 110, in which most files have the same ACL (ACL A), while one of the files has ACL B.

In the example illustrated in FIG. 1, ACL A contains a set of authorized entities, such as user 1, group 1 and tenant 1, while ACL B represents a variation of ACL A, as it contains user 2 in addition to the default authorization properties of ACL A. Table 1 represents a data structure that stores properties of files that are stored with each file. For example, each file may be stored with a property 1, property 2 and an ACL. Thus, in prior art systems, when files are stored in the file system, they are stored with relevant properties as well as an ACL that is stored alongside each individual file. However, as depicted in FIG. 1, because many of the ACLs consist of the default ACL, and because the ACLs that are different from the default ACL are often a variation of the default ACL, there is a lot of duplicated information taking up memory space in the file system. As an enterprise (e.g., a tenant having a file storage system) and its employees and digital files grow, this storage is further exacerbated.

Figure 2:
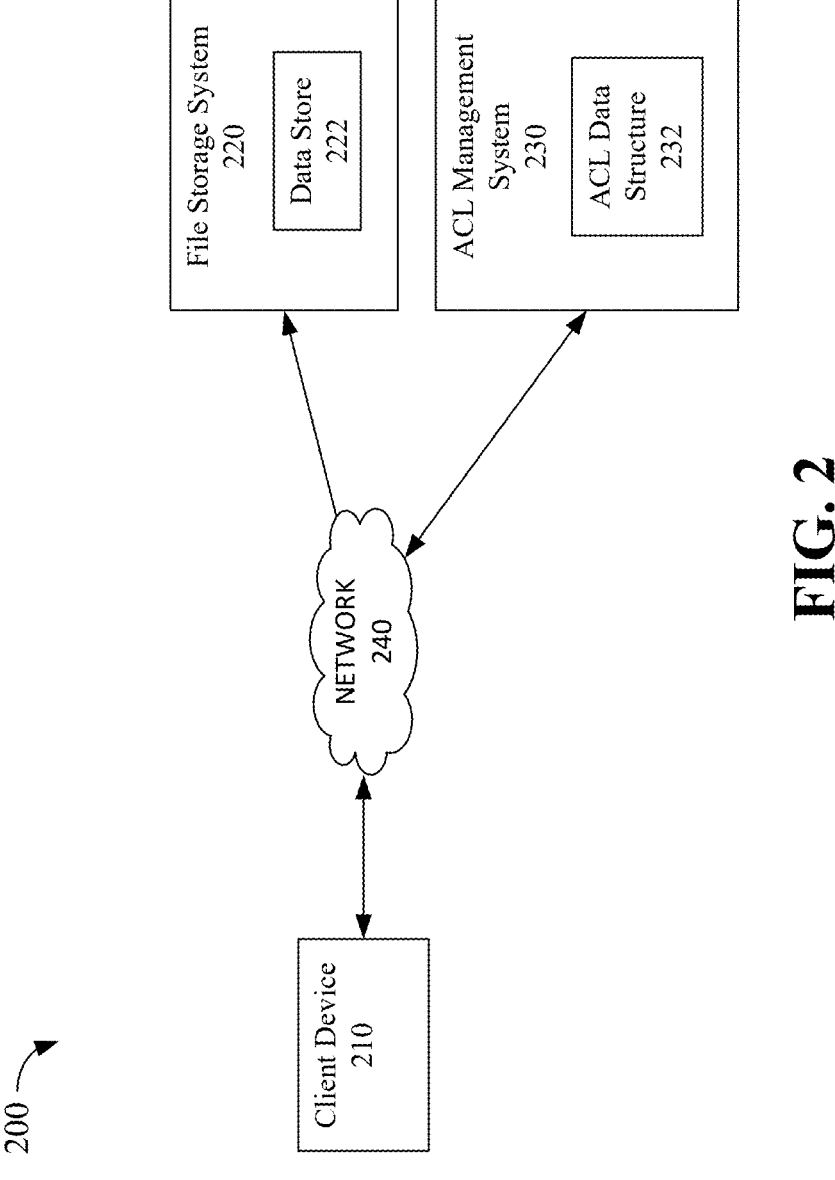
FIG. 2 depicts an example system upon which aspects of this disclosure may be implemented.

FIG. 2 depicts an example system upon which aspects of this disclosure may be implemented. The system 200 includes a client device 210, file storage system 220, and ACL management system 230. Each of the file storage system 220 and the ACL management system 230 may be stored on and/or executed by a server. The plurality of servers work together to deliver the functions and services provided by each system or application included in the servers. The servers can be a physical or virtual computing system, device, or collection thereof, such as, a web server, rack server, blade server, virtual machine server, or tower server, as well as any other type of computing system used to implement the elements of system 200. Servers are implemented using any suitable number and type of physical and/or virtual computing resources (e.g., standalone computing devices, blade servers, virtual machines, etc.).

The file storage system 220 represents a storage system used by an enterprise or other entity (e.g., a tenant) for storing various digital items (e.g., files, documents, metadata, etc.) associated with the entity. The file storage system 220 may be stored on a file storage medium (e.g., file storage server), which may be a cloud-based file storage system (e.g., offered by a third party for use by an enterprise) or may be a locally implemented file storage system. The file storage system 220 includes a data store 222 which functions as a repository in which files and databases of the system 220 are stored. Although shown as a single file storage system and a single data store, the file storage system 220 and data store 222 may be representative of multiple storage devices and data stores which may be accessible by one or more of the ACL management system 230 and the client device 210. The multiple data stores may be located in the same geographic location or may be located in a variety of different geographic locations.

The system 200 includes a client device 210 which is connected to various elements of the system via a network 240. The network 240 may be a wired or wireless network(s) or a combination of wired and wireless networks that connect one or more elements of the system 200. In some implementations, the network 240 includes one or more local area networks (LAN), wide area networks (WAN) (e.g., the Internet), public networks, private networks, virtual networks, mesh networks, peer-to-peer networks, and/or other interconnected data paths across which multiple devices may communicate. In some examples, the network 240 is coupled to or includes portions of a telecommunications network for sending data in a variety of different communication protocols. In some implementations, the network 240 includes Bluetooth® communication networks or a cellular communications network for sending and receiving data including via short messaging service (SMS), multimedia messaging service (MMS), hypertext transfer protocol (HTTP), direct data connection, WAP, email, and the like.

The client device 210 may be a type of personal, business or handheld computing device having or being connected to input/output elements that enable a user to interact with various applications (e.g., local or web-based applications). The client device 210 may be utilized by a user to store and/or access files. Examples of suitable client devices 210 include but are not limited to personal computers, desktop computers, laptop computers, mobile telephones, smart phones, tablets, phablets, smart watches, wearable computers, gaming devices/computers, televisions, and the like. The internal hardware structure of a client device is discussed in greater detail with respect to FIGS. 6 and 7.

In some implementations, the client device 210 includes a local application or a browser application that is executed on the client device 210 and configures the device to be responsive to user input to allow a user to store a file in the file storage system 220, store changes to a file in the file storage system 220 and/or access a file stored in the file storage system 220. When a request to store a new file is submitted via the client device 210, the file is transmitted to the file storage system 220. In previous systems, unless specific access rights are submitted for the file, the file would be stored with a default ACL. In the system 200, however, instead of storing the new file with a new default ACL, a reference to the default ACL may be created and stored with the new file, as discussed in more details below. Then, when a user utilizes the client device 210 to transmit a request to the file storage system 220 to access a file, the files storage system 220 looks up the reference to the ACL, and when it is determined that the ACL is stored in the ACL management system 230, a reference to the ACL list in the ACL management system 230 is made to determine if access to the file should be granted.

The ACL management system 230 is a system (e.g. a processor) that is external to the file storage system 220 and which dynamically analyzes the ACLs in the file storage system 220 to determine if the ACLs should be extracted. This may be achieved by examining the ACLs to determine if each ACL meets certain requirements. In an example, the ACL management system 230 analyzes all the ACLs in the file storage system 220 to identify ACLs that meet the requirements. This may occur, for example, when the ACL management system 230 first analyzes a file storage system to reduce the amount of memory space used for ACL storage in the system. The ACL management system 230 may also analyze all the ACLs in the file storage system based on predetermined time schedules (e.g., once a month), based on an administrator request and/or based on other parameters (e.g., memory usage exceeding a certain threshold). Thus, initiating the process of analyzing the ACLs in the system may be time-based, event-based, based on log mining and the like. The ACL management system 230 may also analyze the ACL associated with a new file, when a new file is transmitted for storage in the file storage system or when a file is saved as a new copy (e.g., save as operation).

The requirements for which an ACL is examined include the size of the ACL (e.g., if the ACL is large in size, for example, if the size exceeds a minimum threshold) and the number of times the same ACL is stored in the system (e.g., the number of files that use the exact ACL or a variation of an exact ACL exceed a given threshold). The thresholds may be predetermined or may be configurable and dynamically adjustable per tenant, region, data center, and the like. For example, the thresholds may be set by an administrator of the file storage system 220. In short, the ACL management system 230 analyzes the ACLs to identify the most relevant and/or storage heavy ACLs in the system which would benefit from normalization. This provides the technical advantage of normalizing ACLs for which normalization reduces the storage and/or computational resources needed for the system. Thus, not all ACLs will require normalization. When the ACL management system 230 identifies an ACL that is a good candidate for normalization, it generates a single entry for the ACL in the ACL data structure 232, as discussed in more detail below. The file storage system 220 then updates a data structure (e.g., hint file) that stores information about the files in the system to refer to the location of the ACL stored in the data structure 232. In this way, instead of storing each ACL separately and/or multiple times in the file storage system 220, relational data structuring is used to refer to a location at which the ACL is stored. This means that the number of the same ACLs stored in the file storage system 220 is reduced significantly, as the files having the same ACL refer to the same location in the ACL data structure 232 to retrieve the ACL, and each unique ACL is only stored once in the data structure 232.

Figure 3A:
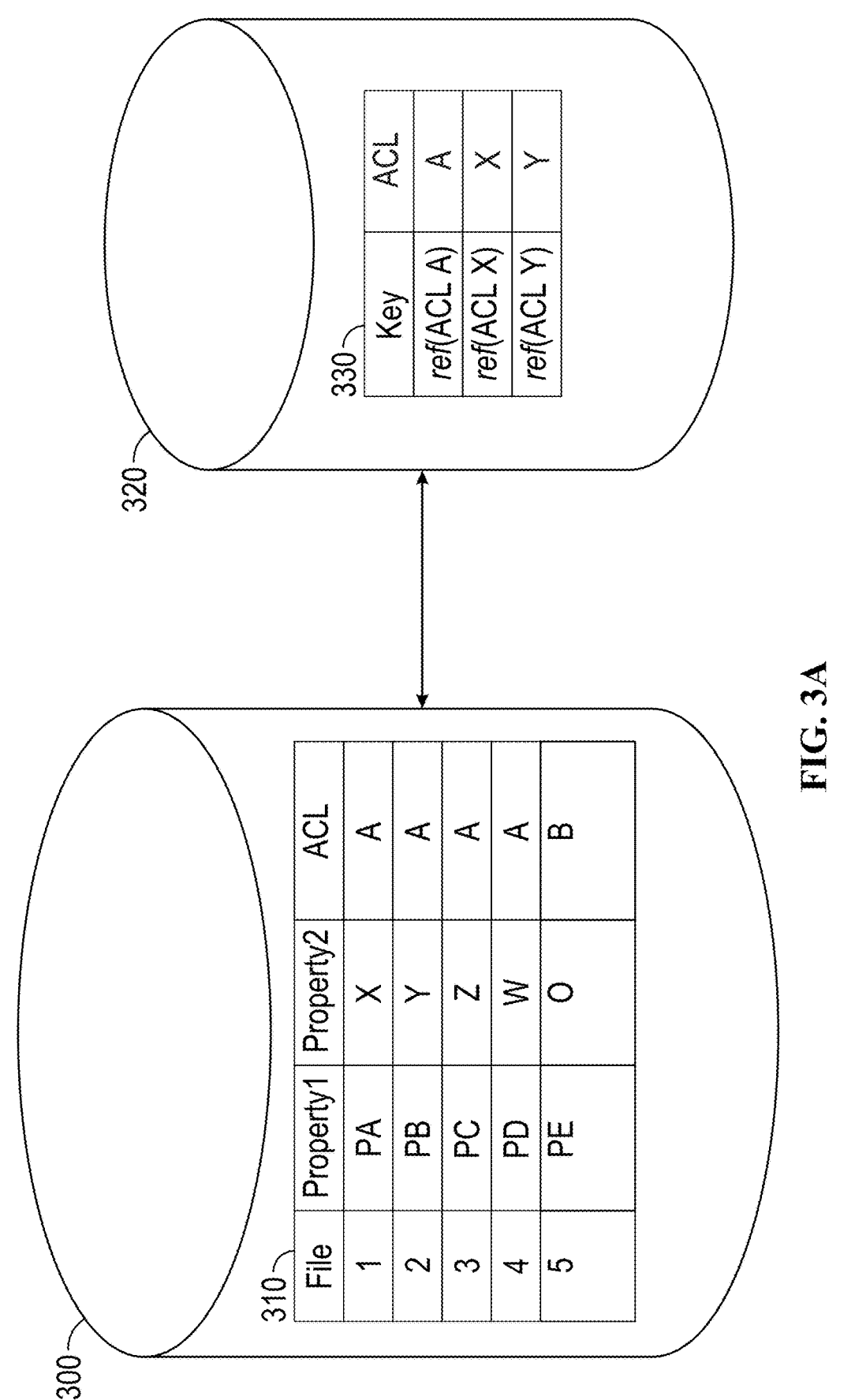
FIGS. 3A-3B depict example manners in which ACLs are extracted and normalized in a file storage system.
Figure 3B:
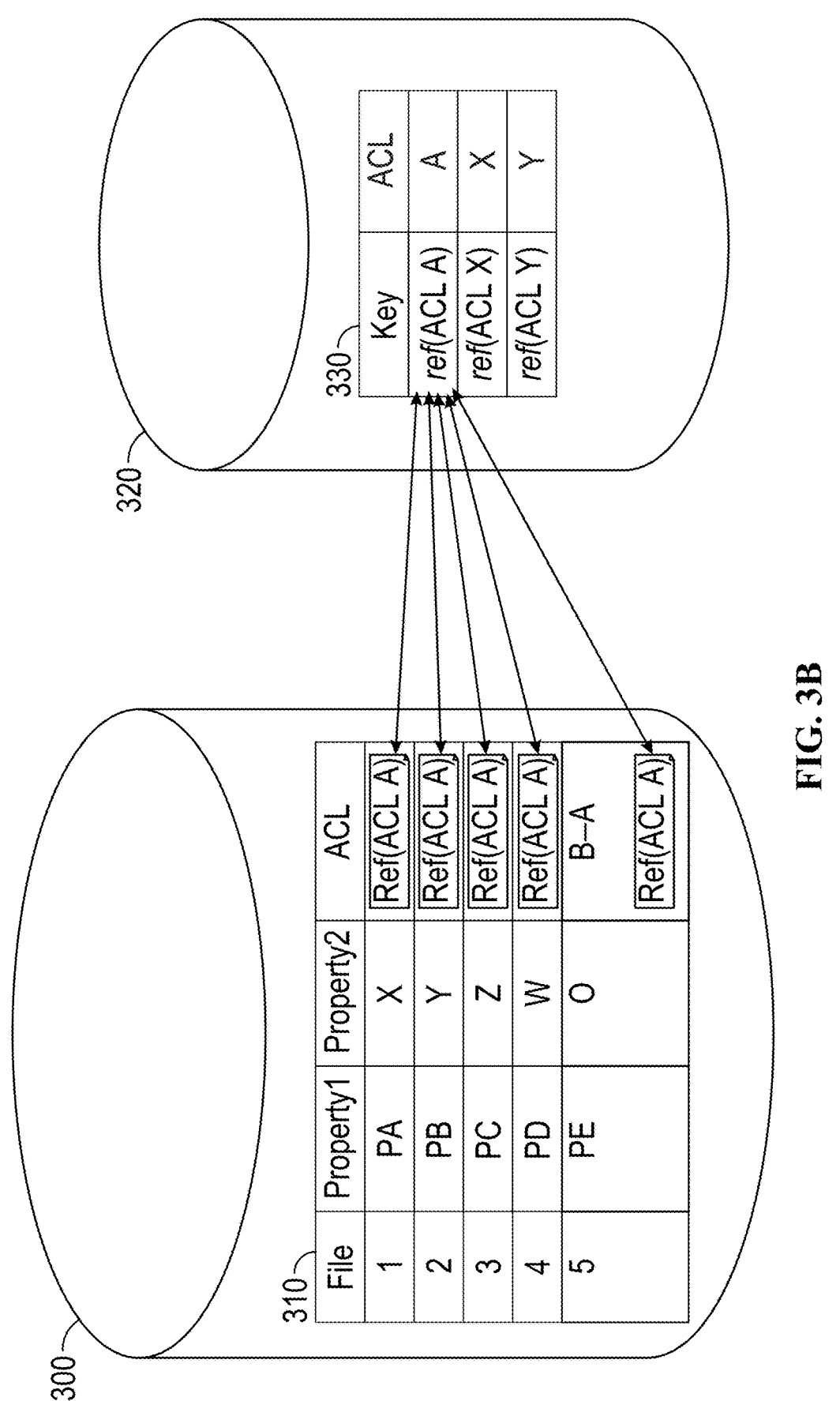

FIGS. 3A-3B depict example manners in which ACLs are extracted and normalized in a file storage system. FIG. 3A depicts an example process of extracting, normalizing and/or linking ACLs in a file storage system with a ACLs stored in a separate data structure. As discussed above, the ACL management system, which in some implementations, is a system that is external to a file storage system, analyzes the files in the system and identifies ACLs that would benefit from normalization. The identified ACLs may include ACLs that are repeated in the system for a predetermine number of times (e.g., a specific number of files use the same ACL), ACLs having a size that is larger than a required minimum, or ACLs that do not significantly differ from a default ACL. In the example depicted in FIG. 3A, this includes ACL A. Thus, the files in the data store 300 are examined to identify ACLs A, ACL X and ACL Y, as requiring normalizing.

For each identified ACL, an entry is created in the data structure 330 of the data store 320. The data store 320 may be a data store that is external to the file storage system and is part of the ACL management system. Alternatively, the data store 320 may be stored within the file storage system but as a separate data structure than the data structure 310 which stores information about the files in the file storage system. In some examples, the data structure 310 is a table that stores information about all the files in the file storage system. The data structure 310 may be referred to as an ACL hint file that stores references to ACLs for the data store. The data includes various properties for the file (e.g., metadata) as well as references to ACLs for each file. In an example, the data structure 310 is a file directory metadata structure.

In some implementations, the data structure 330 is a table that stores data about each identified ACL in the data store 320. The data structure 330 may include a key to the ACL and a reference to a location at which the ACL is stored (e.g., within the data store 320). Alternatively, the data structure 330 includes the ACL key as well as the content of the ACL (e.g., each row includes the ACL key and the associated ACL). In this manner, the data structure 330 creates one entry for each identified ACL. As a result, instead of having a large number of duplicated ACLs, the data structure 330 only includes one entry for each identified ACL. The ACL key may be a reference for the ACL that identifies the ACL. In an example, the key is a hash of the ACL contents. The hash may be created via a known hash generating mechanism. In an example, the ACL key is an identifiable integer reference to the ACL and is a unique reference for each ACL. The reference may be generated using hashing algorithms or using other mechanisms. Thus, data is extracted from the data structure 310 to generate the data structure 330. This may be achieved by the ACL management system, after identifying the appropriate ACLs and involves generating a key for each extracted ACL and storing the key and the ACL in the data structure 330.

After an entry is generated for an identified ACL, the ACL management system may transmit a notification to the data store 300 (e.g., the file storage system) to update the record for each file having the identified ACL. The notification includes the ACL key or another reference that identifies the ACL. The file storage system may then replace the ACL in the data structure 310 with the ACL key. This is depicted in the updated data structure 310 illustrated in FIG. 3B in which the ACL entry for each of the files 1, 2, 3 and 4 is replaced with the ACL A key. ACL B in the data structure 310 is a slight variation of the ACL A. In cases where the ACL is a slight variation of an identified ACL, instead of storing the ACL, the difference is identified and stored along with the ACL key for the identified ACL. Thus, for ACL B, the difference B-A is stored along with the ACL key, Ref (ACL A). As discussed before, this is because most new files are generated with the default ACL. However, if a file is shared with a new user, the user ID of the new user is added to the ACL. In other examples, the ACL is changed slightly for other reasons to add a user ID. In such cases, the only difference between the ACL of the new file and the default ACL is the added user ID of the new user. This difference can be determined by the file storage system and stored in the data structure 310 instead of storing the entire ACL, to save memory space. As a result, the ACL entries for all of the files 1-5 in the data structure 310 point to the ACL key stored in the data structure 330. Thus, the data structure 310 stores the ACL keys and in some cases the difference between the file ACL and a normalized ACL to significantly reduce memory space for storing ACLs. This is because the ACL key requires a lot less memory space than the ACL. As a result, the data store 300 requires fewer memory resources to store files 1-5. This optimizes access to the files as faster access is made possible by the optimized system.

Figure 4A:
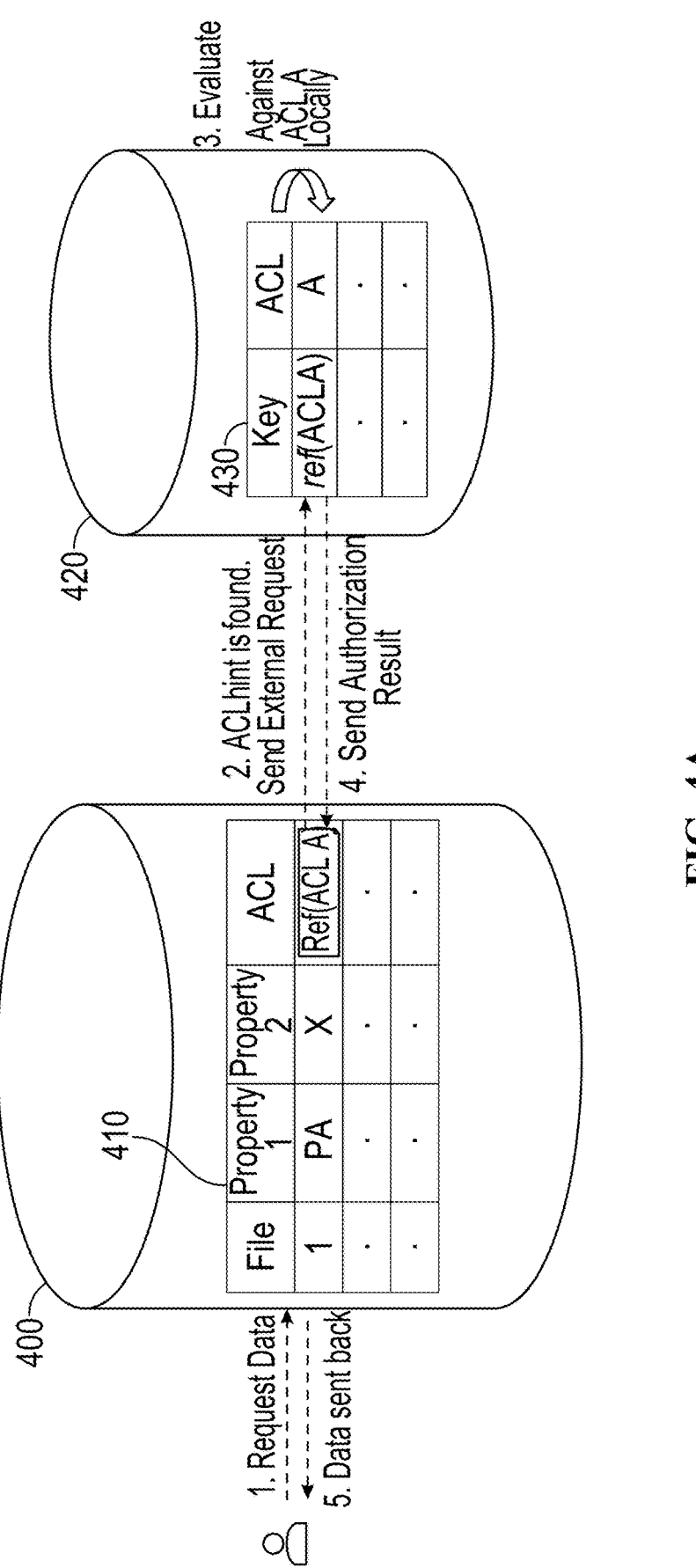
FIGS. 4A-4B depict example diagrams that display using a reference data structure to retrieve ACLs.
Figure 4B:
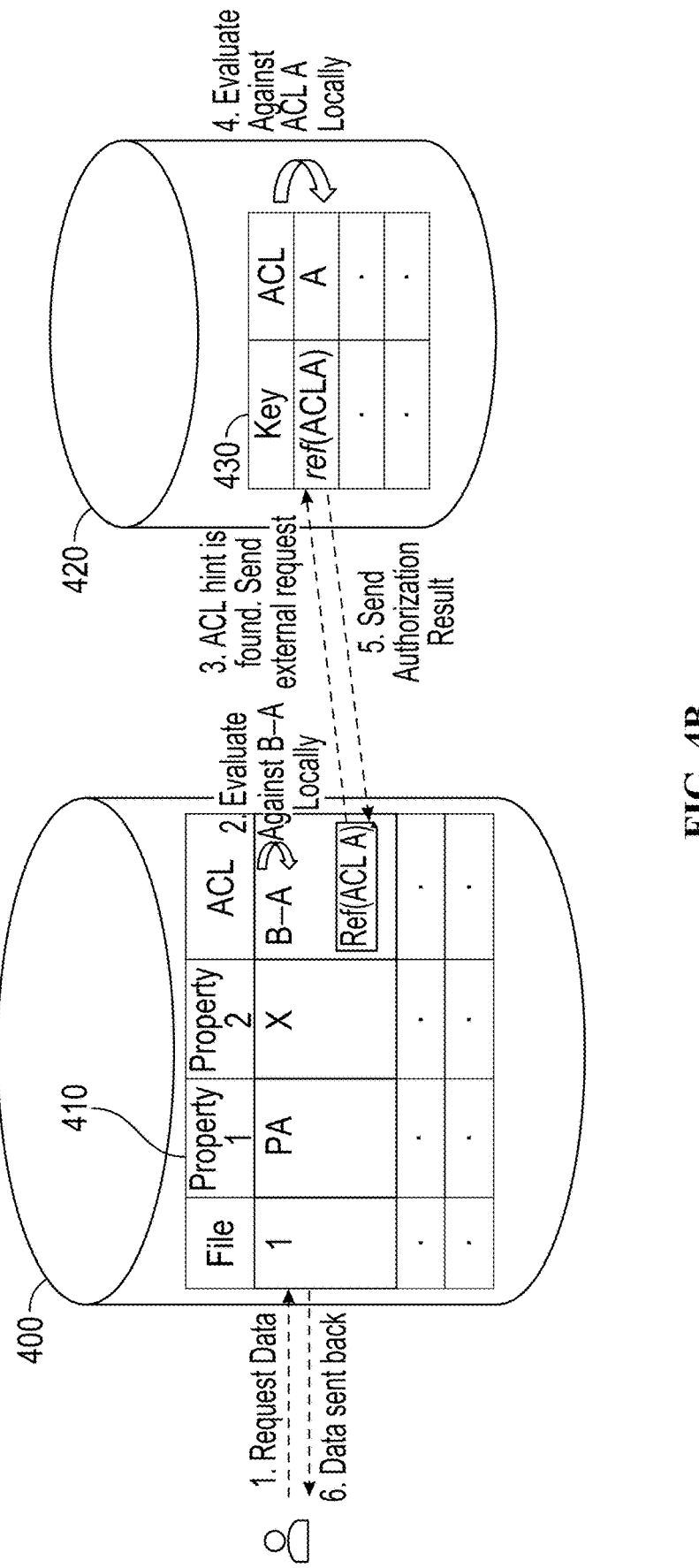

FIGS. 4A-4B depict example diagrams that display using a reference data structure to retrieve ACLs. FIG. 4A displays an example of the steps involved in retrieving an ACL that has been normalized and stored in a separate ACL data structure, such as the data structure 430 of data store 420. When a file storage system that includes the data store 400 receives a request for accessing a file such as file 1, it looks up the file properties such as the file's ACL in the file data structure 410 of the file storage system. Because file 1's ACL has been normalized, when the ACL entry for file 1 is looked up, it points to the ACL key, Ref (ACL A). Thus, at step 2 of the process, the ACL key (also referred to as ACL hint) is located. As a result, an external request is transmitted from the file storage system to the ACL management system which includes the data store 420 or which provides access to the data store 420. The ACL management system then compares the ACL key to the entries in the data structure 430 to locate the desired ACL. Once the ACL is located, the ACL management system sends the authorization results to the data store 400. In some implementations, this involves transmitting the ACL back to the file storage system. In other implementations, the ACL management system evaluates the data request against the ACL to determine if the user is authorized to access the file and transmit the results to the file storage system. This implementation has the technical advantage of reducing the amount of bandwidth required to transmit the ACL to the file storage system. The process of evaluating the access request against the ACL may involve determining if the user is included in the list of users who are allowed to access the file and/or whether the type of access requested is allowed. Once the authorization result and/or the ACL itself is received by the data store 400, the file storage system either provides access to the file by sending the data back to the requesting user or entity, or denies the request, depending on the result of the authorization.

FIG. 4B depicts an example of the steps involved in retrieving an ACL which is a variation of a normalized ACL stored in an ACL data structure, such as the data structure 430 of data store 420. As discussed above, when a file storage system that includes the data store 400 receives a request for accessing a file, such as file 1, the file storage system looks up the file properties to locate the entry associated with the file's ACL in the file data structure 410. In this instance, the file storage system determines that ACL includes a portion that is stored locally and as well as a reference to an externally stored ACL. As a result, at step 2, the file storage system evaluates the request against B-A locally. This involves evaluating the request to determine if the portion of the ACL stored locally indicates that the user is authorized to access the file. In instances where the difference is the user ID of the user requesting the file, this may include that access is allowed. However, to ensure that the type of access requested is allowed and/or to ensure accuracy of the verification, the system also transmits an external request to the ACL management system. The ACL management system then compares the ACL key to the entries in the data structure 430 to locate the desired ACL. Once the ACL is located, the ACL management system evaluates the data request against the ACL to determine if the user is authorized to access the file and/or if the type of access requested is allowed and transmits the results to the file storage system. The process of evaluating the access request against the ACL may involve determining if the user is included in the list of users who are allowed to access the file and/or whether the type of access requested is allowed. Once the authorization result and/or the ACL itself is received by the data store 400, the file storage system then combines the result with the result of the preliminary evaluation done based on B-A to make a final determination as to whether access is allowed. The file storage system then cither provides access to the file by sending the data back to the requesting user or entity, or denies the request, depending on the result of the evaluation.

FIG. 5 is a flow diagram depicting an exemplary method for storing a plurality of ACLs associated with resources in a file storage system. One or more steps of the method 500 may be performed by a file storage system such as the file storage system 220 of FIG. 1. Other steps of the method 500 may be performed by an ACL management system such as the ACL management system 230 of FIG. 1.

Method 500 begins by analyzing the plurality of ACLs in the file storage system to determine that an ACL from among the plurality of ACLs meets one or more requirements for normalization, at 505. This may be initiated by a user request or may occur on time-based or event-based parameters. In an example, analyzing the files in a file storage system occurs once when the system first begins using the ACL management system, and subsequently for new files or based on specific events. In other implementations, the process is repeated based on a predetermined or configurable schedule. The frequency and types of events that can invoke the process may be changeable based on tenant, file storage system, and the like. In some implementations, the ACL management system is external to the file storage system and the file storage system stores a plurality of resources, where each resource of the plurality of resource in the file storage system is stored with an associated ACL.

The one or more requirements may also be changeable and configurable and may relate to the size of the ACL, the number of resources using the ACL and the like. Upon determining that the ACL from the among the plurality of ACLs meets the one or more requirements, method 500 proceeds to generate an ACL key for the ACL, at 510. The ACL key references the ACL and may be an identifiable integer reference. In an example, the ACL key is a hash of the content of the ACL.

After the ACL key is generated, method 500 proceeds to store the ACL key along with the ACL in an ACL data structure, at 515. In some implementations, the ACL data structure is external to the file storage system. The ACL data structure may be a table that includes a separate row for each ACL that meets the one or more requirements. Each row of the table includes an entry for the ACL key and a separate entry for the ACL. In some implementations, after the ACL key is generated, an entry is generated in the ACL data structure for the ACL. The ACL data structure forms a relational data structure used to refer to the ACL by the file storage system.

Once the ACL key is stored in the ACL data structure, method 500 proceeds to transmit the ACL key to the file storage system for storage with each file associated with the ACL, at 520. The file storage system stores the ACL key with each file associated with the same ACL instead of storing the ACL multiple times. In this manner, the file storage system reduces the amount of memory space required for storing ACLs, thus significantly improving computing resources and increasing resource and ACL access speed.

In some implementations, the process for analyzing an ACL occurs when a new file is submitted for storage to the file storage system. In such implementations, the process may begin by receiving a request to store the file in the files storage system. Upon receiving the request, the file storage system generates an ACL for the file based on the request and transmits the ACL to the ACL management system for analysis to determine if the ACL meets one of more requirements. Once the ACL management system analyzes the ACL, the file storage system receives an ACL key for the ACL from the ACL management system if the ACL management system determines that the ACL meets the requirements (e.g., a copy of a default ACL). The file management system then stores the ACL key instead of the ACL with the new file.

Figure 6:
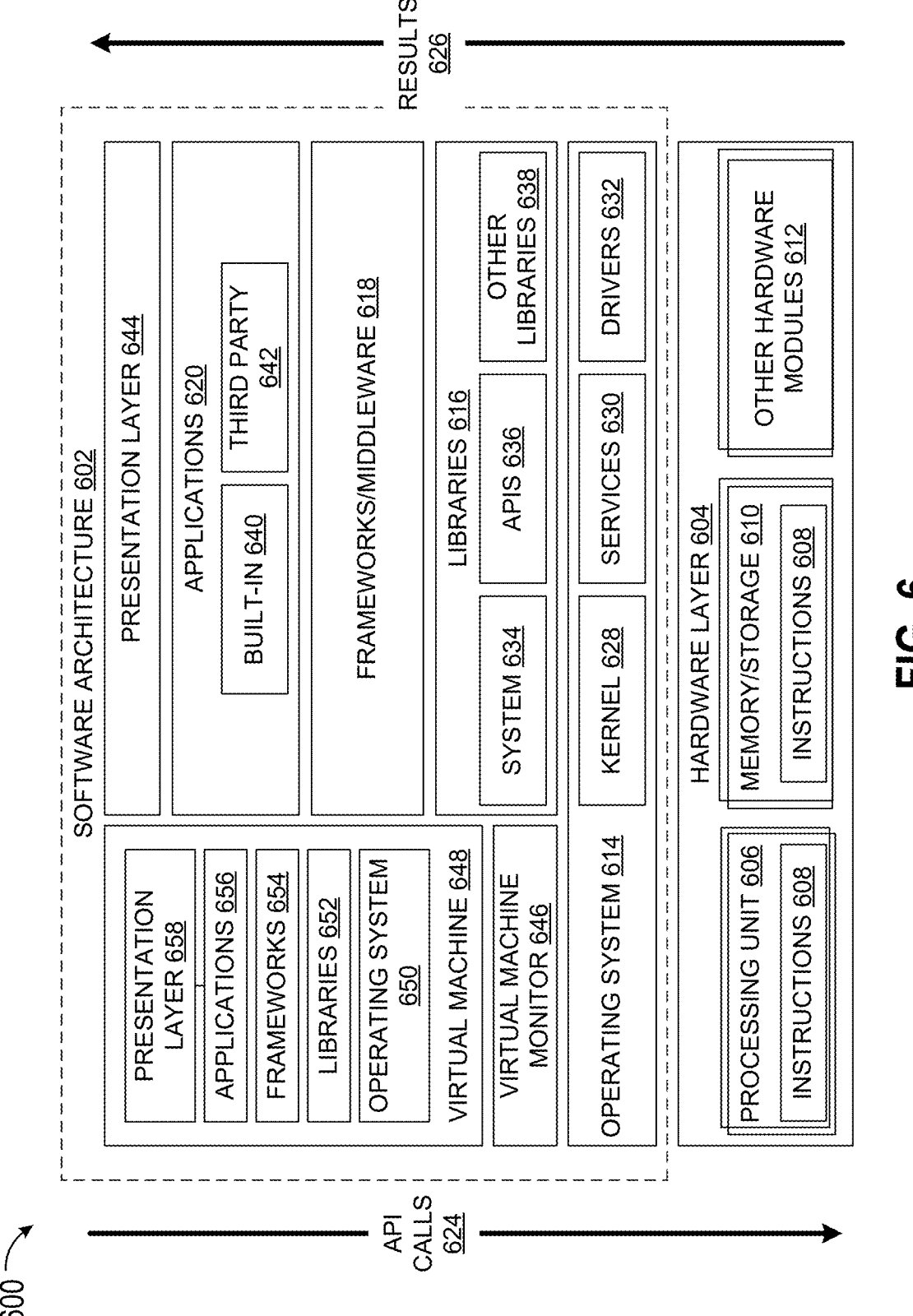
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as client devices, native application providers, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular system. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine depicted in block diagram 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
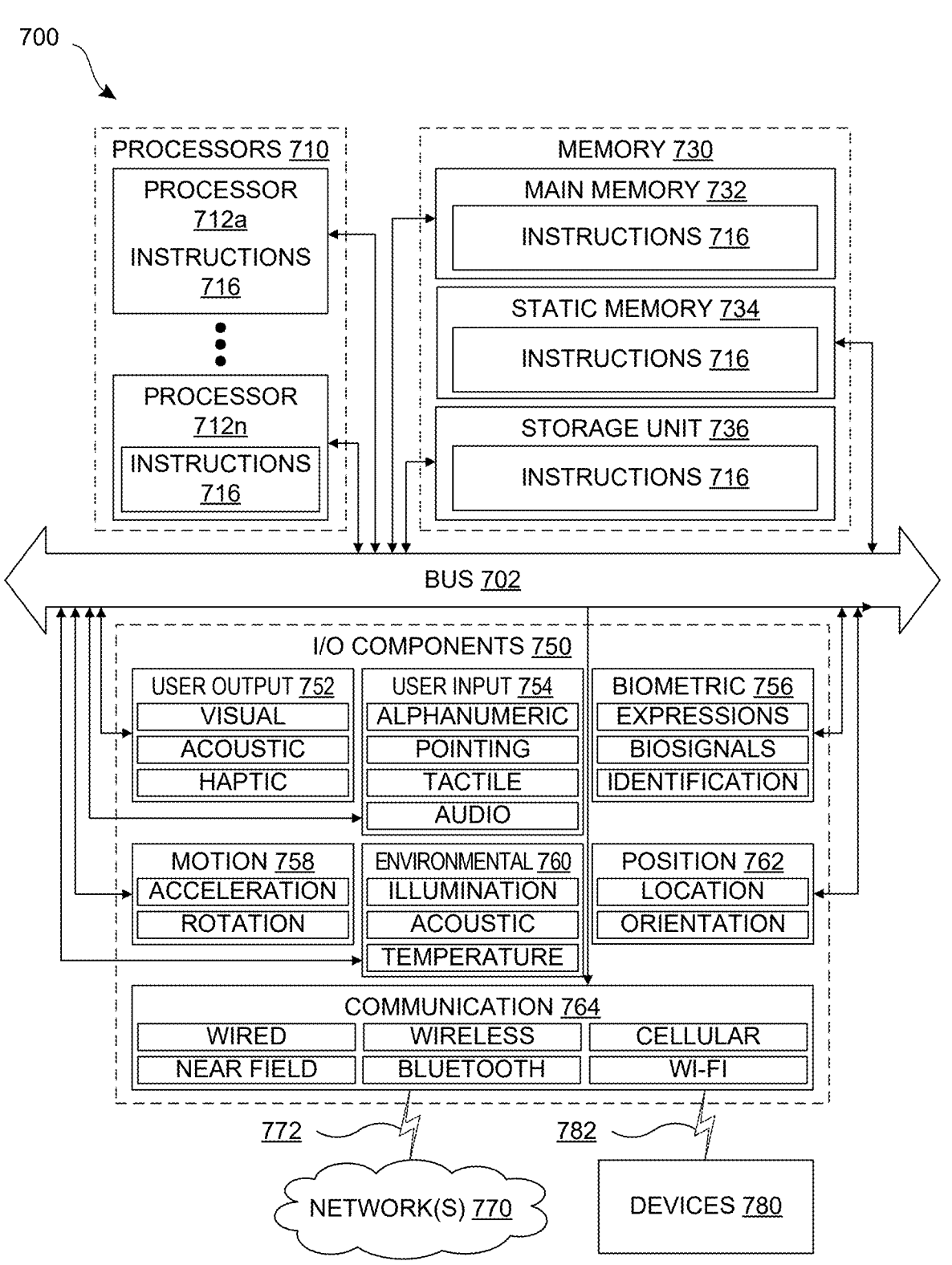
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof.

Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers). The motion components 758 may include, for example, motion sensors such as acceleration and rotation sensors. The environmental components 760 may include, for example, illumination sensors, acoustic sensors and/or temperature sensors.

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 764 such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

In the foregoing detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Generally, functions described herein (for example, the features illustrated in FIGS. 1-7) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

What is claimed is:

1. An Access Control List (ACL) management system for reducing an amount of memory space required to store a plurality of files in a file storage system, the ACL management system comprising:

a processor; and a memory in communication with the processor, the memory comprising executable instructions that, when executed by the processor alone or in combination with other elements, cause the ACL management system to perform functions of:

analyzing an ACL in a subset of the plurality of files having an ACL entry containing the ACL to determine whether the ACL meets one or more requirements to be normalized; and upon determining that the ACL meets the one or more requirements to be normalized:

generating an ACL key for the ACL, the ACL key being an identifiable integer reference to the ACL, storing the ACL key and the ACL in an ACL data structure, transmitting the ACL key to the file storage system for storage in an ACL hint file, and replacing the ACL entry to be normalized in the subset of the plurality of files with the ACL key, wherein the ACL management system retrieves the ACL for the subset of the plurality of files using the ACL hint file.

2. The ACL management system of claim 1, wherein the ACL key is a hash of content of the ACL.

3. The ACL management system of claim 1, wherein the ACL data structure is external to the file storage system.

4. The ACL management system of claim 1, wherein determining that the ACL meets the one or more requirements includes determining at least one of the ACL being used by at least a predetermined number of files, the ACL having a size that meets a threshold size requirement or the ACL differing from an exact ACL that is used by at least the predetermined number of files by a given variation.

5. The ACL management system of claim 1, wherein determining that the ACL meets the one or more requirements includes determining that the ACL is a default ACL or a variation of the default ACL.

6. The ACL management system of claim 1, wherein the ACL data structure is stored in a data store of the ACL management system.

7. The ACL management system of claim 1, wherein the instructions further cause the ACL management system to perform functions of:

receiving a request to access a file stored in the file storage system, the request including the ACL key for the file;

looking up the ACL key in the ACL data structure to locate the ACL;

evaluating the request to access the file against the ACL to determine if access to the file is allowed; and transmitting results of the evaluation to the file storage system, a result either granting or denying the access to the file.

8. The ACL management system of claim 1, wherein the one or more requirements are configurable.

9. The ACL management system of claim 1, wherein analyzing the ACL occurs based on at least one of a time-based schedule or event-based determination.

10. A method for reducing an amount of memory space required for storing a plurality of files in a file storage system, the method comprised of:

analyzing an access control list (ACL) in a subset of the plurality of files having an ACL entry containing the ACL in the file storage system, via an ACL management system, to determine whether the ACL meets one or more requirements to be normalized, the ACL management system being external to the file storage system; and upon determining that the ACL meets the one or more requirements to be normalized:

generating an ACL key for the ACL, the ACL key referencing the ACL, storing the ACL key and the ACL in an ACL data structure that is external to the file storage system, transmitting the ACL key to the file storage system for storage in an ACL hint file, and replacing the ACL entry to be normalized in the subset of the plurality of files with the ACL key, wherein the ACL management system retrieves the ACL for the subset of the plurality of files using the ACL hint file.

11. The method of claim 10, further comprising removing the ACL from the file storage system.

12. The method of claim 10, further comprising:

receiving a request to access a resource stored in the file storage system, the request including the ACL key for the resource;

looking up the ACL key in the ACL data structure to locate the ACL;

evaluating the request to access the resource against the ACL to determine if access to the resource is allowed; and transmitting results of the evaluation to the file storage system, a result either granting or denying the access to the resource.

13. The method of claim 10, wherein the ACL key is a hash of content of the ACL.

14. The method of claim 10, wherein determining that the ACL meets the one or more requirements includes determining at least one of the ACL being used by at least a predetermined number of files, the ACL having a size that meets a threshold size or the ACL differing from an exact ACL that is used by at least the predetermined number of files by a given variation.

15. The method of claim 10, wherein the ACL data structure is a table that includes a row for each normalized ACL that includes the ACL key and its associated ACL.

16. The method of claim 10, wherein the one or more requirements are configurable.

17. A file storage system for reducing an amount of memory space required to store a plurality of files, the file storage system comprising:

a processor; and a memory in communication with the processor, the memory comprising executable instructions that, when executed by the processor alone or in combination with other elements, cause the file storage system to perform functions of:

receiving a request to store a file having an ACL entry in the file storage system;

generating an Access Control List (ACL) for the file based on the request;

transmitting the ACL to an ACL management system for analysis to determine if the ACL meets one or more requirements to be normalized:

upon determining that the ACL meets the one or more requirements to be normalized, generating an ACL key for the ACL, the ACL key being an identifiable integer reference to the ACL, storing the ACL key and the ACL in an ACL data structure, transmitting the ACL key to the file storage system for storage in an ACL hint file, and replacing the ACL entry to be normalized in the file with the ACL key, wherein the ACL management system retrieves the ACL for the file using the ACL hint file.

18. The file storage system of claim 17, wherein the executable instructions when executed by the processor alone or in combination with other elements cause the file storage system to perform functions of:

receiving an indication from the ACL management system that a generated ACL is a variation of the ACL stored by the ACL management system, the ACL key referencing a stored ACL;

determining a difference between the generated ACL and the stored ACL; and storing the difference between the generated ACL and the stored ACL along with the ACL key.

* * * * *